United States Patent [19]
Derbyshire

[11] 3,751,052
[45] Aug. 7, 1973

[54] DRILL CHUCK
[75] Inventor: George C. Derbyshire, Sheffield, England
[73] Assignee: The Jacobs Manufacturing Company, Limited, Sheffield, England
[22] Filed: Nov. 22, 1971
[21] Appl. No.: 201,090

[30] Foreign Application Priority Data
May 13, 1971 United Kingdom.............. 14,870/71

[52] U.S. Cl.................... 279/18, 279/1 C, 279/1 Q, 279/84
[51] Int. Cl............................................. B23b 31/04
[58] Field of Search....................... 279/84, 86, 1 C, 279/1 Q, 83, 85, 18

[56] References Cited
UNITED STATES PATENTS
820,263   5/1906   Schmid et al.......................... 279/18
715,252   12/1902  Errington.............................. 279/18
942,304   12/1909  Bomborn et al....................... 279/18
2,324,130 7/1943   Beckwith.............................. 279/18
1,772,495 8/1930   Powell................................. 279/1 Q
3,610,641 10/1971  Ryder.................................. 279/1 Q Primary Examiner—Andrew R. Juhasz
Assistant Examiner—Z. R. Bilinsky
Attorney—Stephen J. Rudy

[57] ABSTRACT

A drill chuck having a sleeve for reception of a drill shank through a central hole in its front end into a body part received into the sleeve, the body part having mutually slidable gripping members provided with apertures into which the shank is received and retained by means of adjustable screws in the slidable member. The sleeve protectively covers over the screws; and the body part is adapted for attachment to a driving spindle.

In a modified form the sleeve may be of plastics material, which the body may be of plastics, or rubber material.

10 Claims, 12 Drawing Figures

INVENTOR
GEORGE C. DERBYSHIRE

BY Stephen J. Rudy

ATTORNEY

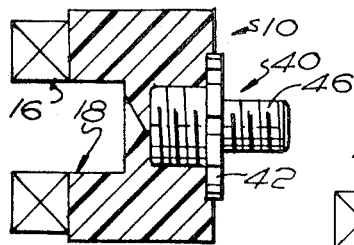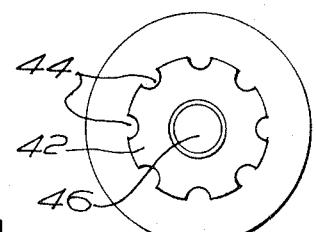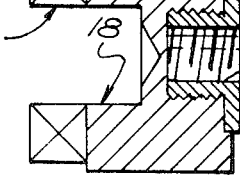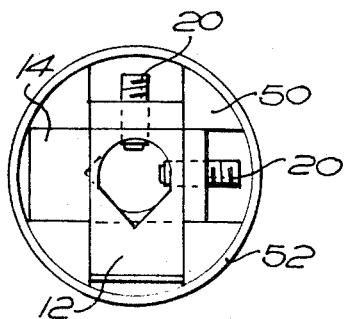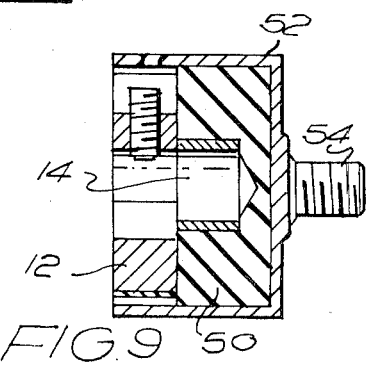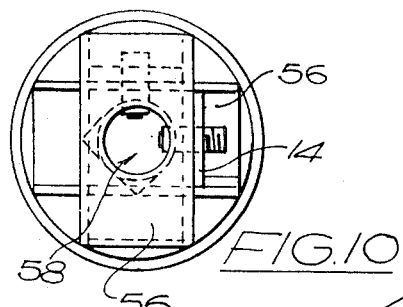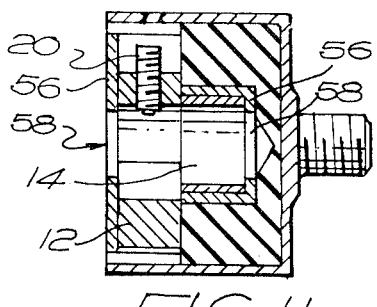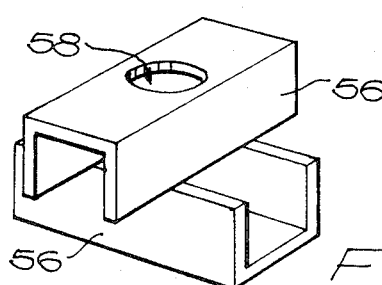

3,751,052

DRILL CHUCK

BACKGROUND OF THE INVENTION

The invention relates to drill chucks and has for its object to provide an improvement therein.

According to the invention, there is provided a drill chuck including a body part, a pair of gripping members movable therein in mutually perpendicular directions, each gripping member comprising an apertured member capable of receiving a drill shank in its aperture and a screw for retaining the drill shank in said aperture, and a sleeve surrounding said body part and provided with radial holes to permit adjustment of the screws in the apertured members, said sleeve being a snap fit on said body part. Preferably, the gripping members are slidably mounted in the body part in mutually perpendicular diametrical channels. Preferably also, the sleeve will be a snap fit on the body part in such a position that the radial holes will be in alignment with the screws in the apertured members and this may be arranged by projections within the sleeve being received in the other extremities of the channels in which the gripping members are slidable. On the other hand, however, this could be arranged by a locking key being formed within the sleeve and engaging a groove extending longitudinally along the periphery of the body part. The sleeve surrounding the body part may be formed integrally with an end plate having a central hole through which a drill shank may extend. Said sleeve and integral end plate may be made of a synthetic plastics material and in this case the central hole will preferably be provided with a metal liner peened over inside and outside the end plate. The body part may also be made in part of a synthetic plastics material but in this case will be provided with a metal spigot or nut for its ready connection to a machine tool or hand tool or the like. In this case also, mutually perpendicular diametrical channels may be moulded directly in the synthetic plastics material for the gripping members to be slidable therein; alternatively, however, the gripping members, which are of metal, may be moulded in the synthetic plastics material of which the body part is at least in part formed, although in this case it will be preferable for the synthetic plastics material to be surrounded by a metal casing or for a metal end portion of said body part to be provided with metal "dogs" which project into the mass of synthetic plastics material or bonded rubber to support it.

BRIEF DESCRIPTION OF DRAWING

In order that the invention may be fully understood and readily carried into effect, the same will now be described, by way of example only, with reference to the accompanying drawings, of which:

FIGS. 5 to 12 are scrap views which will presently be referred to when possible modifications are being described.

DESCRIPTION OF PREFERRED EMBODIMENTS

Figure 1:
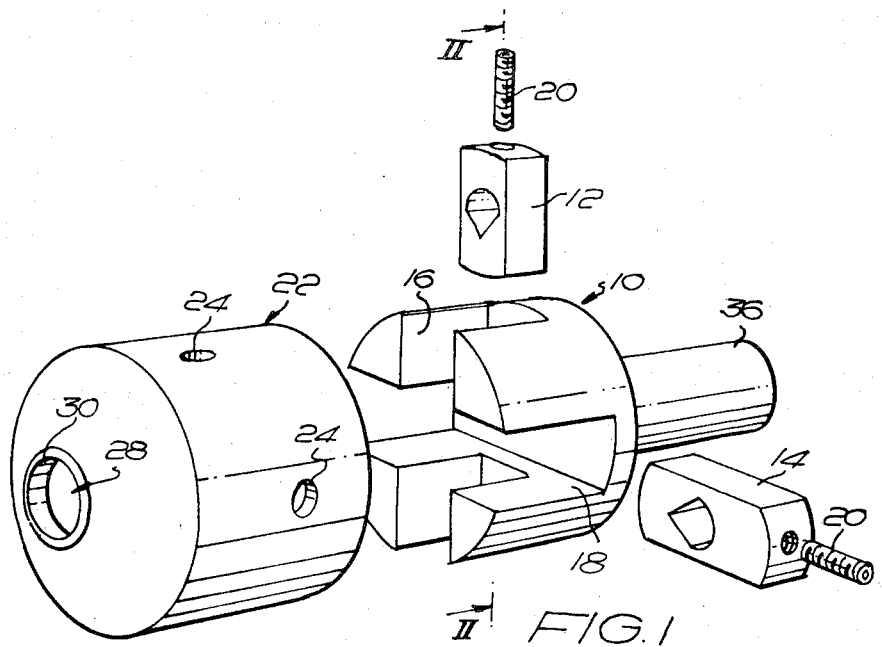
FIG. 1 is a perspective exploded view of a drill chuck embodying the invention.
Figure 2:
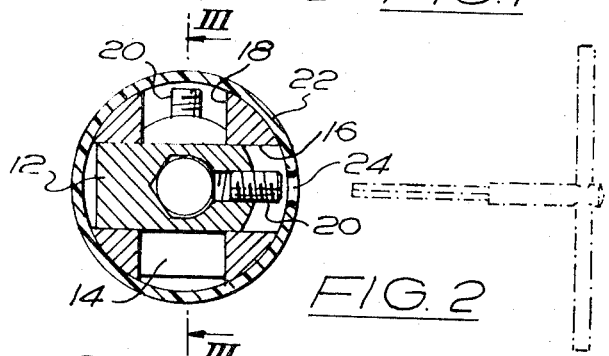
FIG. 2 is a cross-section on the line II—II in FIG. 1.

Referring now to FIGS. 1 to 4 of the drawings, these illustrate a drill chuck which includes a body part, generally indicated 10, and a pair of gripping members 12 and 14 which are slidable therein in mutually perpendicular diametrical channels 16 and 18. The channel 16 is shallower than the channel 18 and the arrangement is such that, when mounted in their channels, the gripping member 12 overlies the gripping member 14.

As perhaps best shown in FIG. 1, each gripping member comprises an apertured member capable of receiving a drill shank in its aperture, which is partly of V-form, and a grub screw 20 for retaining the drill shank in said aperture and for imparting rotation thereto as the chuck rotates. The arrangement is such that whatever size of drill is mounted in the chuck, within the capacity of the chuck of course, the drill assumes a position at the axis of the body part by virtue of the diametrical location of the gripping members. A dimple 11 is formed at the bottom of the channel 18, at the axis of the body part, to assist in locating a drill shank at the axis of rotation.

A sleeve 22 made of a synthetic plastics material surrounds the body part and hides the gripping members from view. It also prevents the complete extraction of the grub screws 20 since although it is provided with radial holes 24 through which a suitable key can be inserted for the adjustment of the screws, said holes are not sufficiently large to allow the passage of said screws. (A suitable key for engaging the grub screws is shown in chain-dotted lines in FIG. 2.) Consequently, there is no danger of an operative being able to do himself an injury by grasping the chuck before it has quite stopped if by chance one of the grub screws has worked loose during service.

Figure 3:
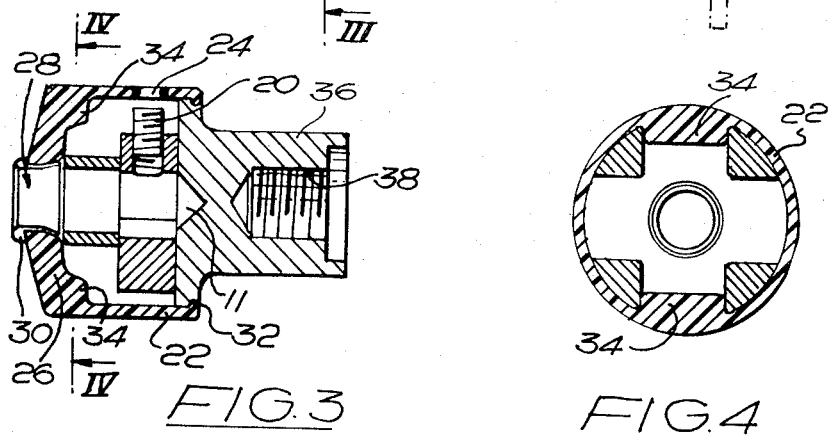
FIG. 3 is a cross-section on the line III—III in FIG. 2.
Figure 4:
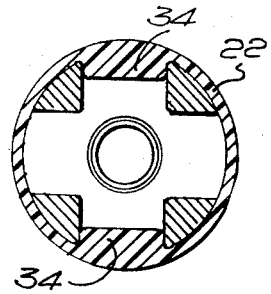
FIG. 4 is a cross-section on the line IV—IV in FIG. 3.

The sleeve 22 is formed integrally with an end plate 26 having a central hole 28 through which a drill shank may extend. The hole 28 is provided with a metal liner 30 which is peened over inside and outside the end plate as shown in FIG. 3; this protects the end plate from damage if it should briefly come into contact with a workpiece as a drill "breaks through" it.

The sleeve is a snap fit on the body part in such a position that the radial holes 24 are in alignment with the screws 20. The snap fit is obtained by an in-turned bead 32 which is formed at the end of the sleeve remote from the end plate and which snaps over the end of the body part. The angular location of the sleeve on said body part is brought about by projections 34 which have been moulded within the sleeve and which are received in the outer extremity of one of the channels in which the gripping members are slidable.

It will be observed that the body part 10 is provided with a spigot 36 with a threaded bore 38 so that the chuck can be mounted upon an arbor and used on a machine tool. However, it will be understood that depending upon the particular market for which the chuck is intended, it may have other mounting means. For example, the body part could have an externally threaded spigot or could even be provided with a "Morse taper" spindle or power tool spindle, i.e., a straight shank.

Referring now to FIGS. 5 and 6, in a modification of the chuck just described, the body part 10 has been formed largely of a synthetic plastics material with the channels 16 and 18 moulded in it. The body part has been moulded around a threaded end of a metal adaptor element 40 (threading being a convenient method of obtaining a good "key" in the synthetic plastics). An annular flange 42 which is formed on the adaptor element has peripheral indentations 44 which provide a further key between the adaptor element and the main mass of material forming the body part. The adaptor element is provided with a spigot portion 46 having an external screw-thread for its connection to a power tool.

In FIG. 7, there is illustrated a construction similar to that just described except that the adaptor element, instead of having a screw-threaded spigot portion, is hollow and has an internal screw-thread 48 for its connection to a different type of power tool.

Referring now to FIGS. 8 and 9, in a further possible modification, the body part is formed largely of bonded rubber 50 within which the gripping members 12 and 14 are slidably mounted in the channels which have been moulded in said body part. A metal casing 52 surrounds the bonded rubber and is provided with an integral spigot portion 54 which has an external screw-thread for its connection to a power tool. (But, as in the case of the chucks previously described, it could have any other form of mounting means desired.) This construction is particularly suitable for giving a cushioning effect when impact drilling.

In FIGS. 10, 11 and 12, there is illustrated a construction of body part similar in some respects to that just described with reference to FIGS. 8 and 9; that is to say, the gripping members 12 and 14 are slidably disposed within a mass of bonded rubber which serves to give a cushioning effect when impact drilling. However, in this case, jaw guides 56 of channel section shown in perspective in FIG. 12, have been pressed into channels moulded in the rubber and the gripping members are slidable in said guides in mutually perpendicular directions. Said jaw guides are each provided with a central hole through which the shank of a drill can extend.

Various other modifications may, of course, be made without departing from the scope of the invention.

What is claimed is:

1. A drill chuck including a body part, a pair of gripping members movable therein in mutually perpendicular relation, each gripping member comprising an apertured member capable of receiving a drill shank in its aperture and a screw for retaining the drill shank in said aperture, and a sleeve surrounding said body part and provided with radial holes to permit adjustment of the screws in the apertured members, said sleeve having a snap fit on the body part, wherein the sleeve is formed of synthetic plastics material having a coned head provided with a central hole adapted for reception of the shank of a tool, the hole being fitted with a metal liner projecting at one end beyond the outer face of the coned head.

2. A drill chuck as in claim 1, wherein the gripping members are slidably mounted in the body part in mutually perpendicular diametrical channels.

3. A drill chuck as in claim 1, wherein the sleeve surrounds the screws, and the radial holes are relatively smaller in diameter than the screws so as to prevent escape of the screws from the gripping members through the radial holes.

4. A drill chuck as in claim 3, wherein internal projections formed in the sleeve are slidably received in the channels, and the radial holes are so located in the sleeve as to be aligned radially with the screws when the projections of the sleeve are so received.

5. A drill chuck as in claim 3, wherein the end of each screw is formed with a cavity adapted to accommodate an adjusting tool passed through a related radial hole.

6. A drill chuck as in claim 1, wherein the body part is formed with a peripheral step and the sleeve is provided with an inturned bead having a snapped engagement with the peripheral step.

7. A drill chuck as in claim 1, wherein the body part is adapted at its rear end for attachment to a driving spindle.

8. A drill chuck including a body part, a pair of gripping members movable therein in mutually perpendicular relation, each gripping member comprising an apertured member capable of receiving a drill shank in its aperture and a screw for retaining the drill shank in said aperture, and a sleeve surrounding said body part and provided with radial holes to permit adjustment of the screws in the apertured members, said sleeve having a snap fit on the body part wherein the gripping members are slidably mounted in the body part in mutually perpendicular diametrical channels, and wherein the body part comprises a core of rubber material encased in a metal sleeve having a wall backing the core and adapted for attachment to a driving spindle.

9. A drill chuck as in claim 8, wherein the channels are lined with metal guides for the gripping members.

10. A drill chuck as in claim 1, wherein the sleeve has a central hole for axial reception of drill shank and the body has a dimple axially aligned with the hole for centering the drill shank relative to the gripping members.

* * * * *